(12) United States Patent
Yeh et al.

(10) Patent No.: US 8,627,253 B2
(45) Date of Patent: Jan. 7, 2014

(54) METHOD FOR SUBSTRATE NOISE ANALYSIS

(75) Inventors: Tzu-Jin Yeh, Hsin-Chu (TW); Kal-Wen Tan, Taipei (TW); Chewn-Pu Jou, Hsin-Chu (TW); Sally Liu, Hsin-Chu (TW); Fu-Lung Hsueh, Cranbury, NJ (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 195 days.

(21) Appl. No.: 12/766,732

(22) Filed: Apr. 23, 2010

(65) Prior Publication Data

US 2011/0265051 A1    Oct. 27, 2011

(51) Int. Cl.
*G06F 17/50* (2006.01)

(52) U.S. Cl.
USPC ........................................................ 716/115

(58) Field of Classification Search
USPC ................................................ 716/100, 115
See application file for complete search history.

(56) References Cited

U.S. PATENT DOCUMENTS

| 6,020,614 | A | 2/2000 | Worley |
| 6,986,113 | B2 | 1/2006 | Sinha et al. |
| 7,203,629 | B2 | 4/2007 | Özis et al. |
| 7,480,879 | B2 | 1/2009 | Checka et al. |
| 7,865,850 | B1 * | 1/2011 | Kao et al. ................ 716/136 |

OTHER PUBLICATIONS

Soens, C., et al., "Modeling of Substrate Noise Generation, Isolation, and Impact for an LC-VCO and a Digital Modem on a Lightly-Doped Substrate," IEEE Journal of Solid-State Circuits, vol. 41, No. 9, Sep. 2006, pp. 2040-2051.
Van Der Plas, G., et al., "Modeling and experimental verification of substrate coupling and isolation techniques in mixed-signal ICs on a lightly-doped substrate," 2005 Symposium of VLSI Circuits Digest of Technical Papers, pp. 280-283.

* cited by examiner

*Primary Examiner* — Suchin Parihar
(74) *Attorney, Agent, or Firm* — Slater & Matsil, L.L.P.

(57) ABSTRACT

In accordance with an embodiment, a method for substrate noise analysis comprises using a first processor based system, creating and simulating a circuit schematic comprising a multi-terminal model of a transistor, and thereafter, creating a layout based on properties represented in the circuit schematic and simulation results of the simulating. The multi-terminal model comprises a source terminal, a gate terminal, a drain terminal, a body terminal, and a guard-ring terminal.

20 Claims, 16 Drawing Sheets

| 6T | 5T | 4T | VCO TONE (dBm) | SPUR (dBm) | SPUR (dBc) |
|---|---|---|---|---|---|
| A | A/V | SOURCE | -13 | -61 | -48 |
| A | F | SOURCE | -13 | -50 | -37 |
| F | A/V | SOURCE | -13 | -66 | -53 |
| A | A | Vss | -14 | -75 | -61 |
| A | A | A | -16 | -36 | -20 |
| F | F | A | -15 | -36 | -21 |

METHOD FOR SUBSTRATE NOISE ANALYSIS

TECHNICAL FIELD

The present disclosure relates generally to a method of analyzing integrated circuits and, more particularly, to a method for analyzing substrate noise in integrated circuits.

BACKGROUND

Generally, integrated circuit design includes multiple steps to ensure the operability of the designed circuit. One step may be to simulate the operation of the circuit once the layout of the circuit has been designed. One aspect of the simulation may be to determine the effects of noise, such as substrate noise, on analog portions of the circuit. The results of the simulation may indicate a need to alter or re-design the circuit to allow proper functionality in different circumstances.

An electronic design automation (EDA) tool is typically used when simulating integrated circuit. An EDA generally requires a completed circuit layout to perform the simulation and analysis. The EDA may analyze the effect of substrate noise on the circuit. Once the effects are determined, a complete re-design of the integrated circuit may be necessary to bring the functionality of the circuit within acceptable ranges. Further, multiple reiterations of the re-design process may be necessary.

Also, simulation using the completed layout on an EDA may require de-bugging complicated netlists. The de-bugging process may be very frustrating for a designer and may require the support of the EDA vendor. Thus, the EDA simulation is not very user-friendly.

Another method may be to use device models and substrate networks for noise analysis. However, this method uses simplified models based on assumptions that some effects are negligible when those effects may not be. Thus, the method generally is too simplified to accurately predict substrate noise for every circuit. Also, the substrate networks used in this method are typically very complicated which leads to complex netlists that are too specific to use for every substrate.

Thus, there is a need in the art to overcome the above stated disadvantages.

SUMMARY

In accordance with an embodiment, a method for substrate noise analysis comprises using a first processor based system, creating and simulating a circuit schematic comprising a multi-terminal model of a transistor, and thereafter, creating a layout based on properties represented in the circuit schematic and simulation results of the simulating. The multi-terminal model comprises a source terminal, a gate terminal, a drain terminal, a body terminal, and a guard-ring terminal.

In accordance with another embodiment, a method for substrate noise analysis comprises using a first processor based system, creating a circuit schematic; using a second processor based system, simulating the circuit schematic thereby resulting in simulation results; determining when the simulation results are unacceptable; upon determining when the simulation results are unacceptable, modifying a component in the circuit schematic to modify at least one property represented in the circuit schematic; and thereafter, creating a layout based on a plurality of properties represented in the circuit schematic. The circuit schematic comprises a first circuit, an aggressor circuit, and a substrate network coupling the first circuit to the aggressor circuit. The substrate network is based on physical features of an expected die size.

In accordance with a further embodiment, a method for substrate noise analysis comprises creating a circuit schematic using a first processor based system; simulating the circuit schematic using a second processor based system; obtaining data from the simulating of the circuit schematic; modifying a component based on the data from the simulating, wherein the component represents at least one of the physical properties of the expected layout; and thereafter, creating a final layout based on the modifying of the component. The circuit schematic comprises a model representing physical properties of an expected layout.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the embodiments.

Embodiments are described in a specific context, namely with regard to the design, simulation, and analysis of an inductor-capacitor tank voltage controlled oscillator (LC tank VCO). Other embodiments may also be applied, however, to other integrated circuits, such as a low noise amplifier (LNA), a power amplifier, etc. Embodiments contemplate simulating a pre-layout circuit with a device model as discussed herein to obtain data regarding substrate noise in an effort to make the circuit design and verification process more efficient.

Figure 1A:
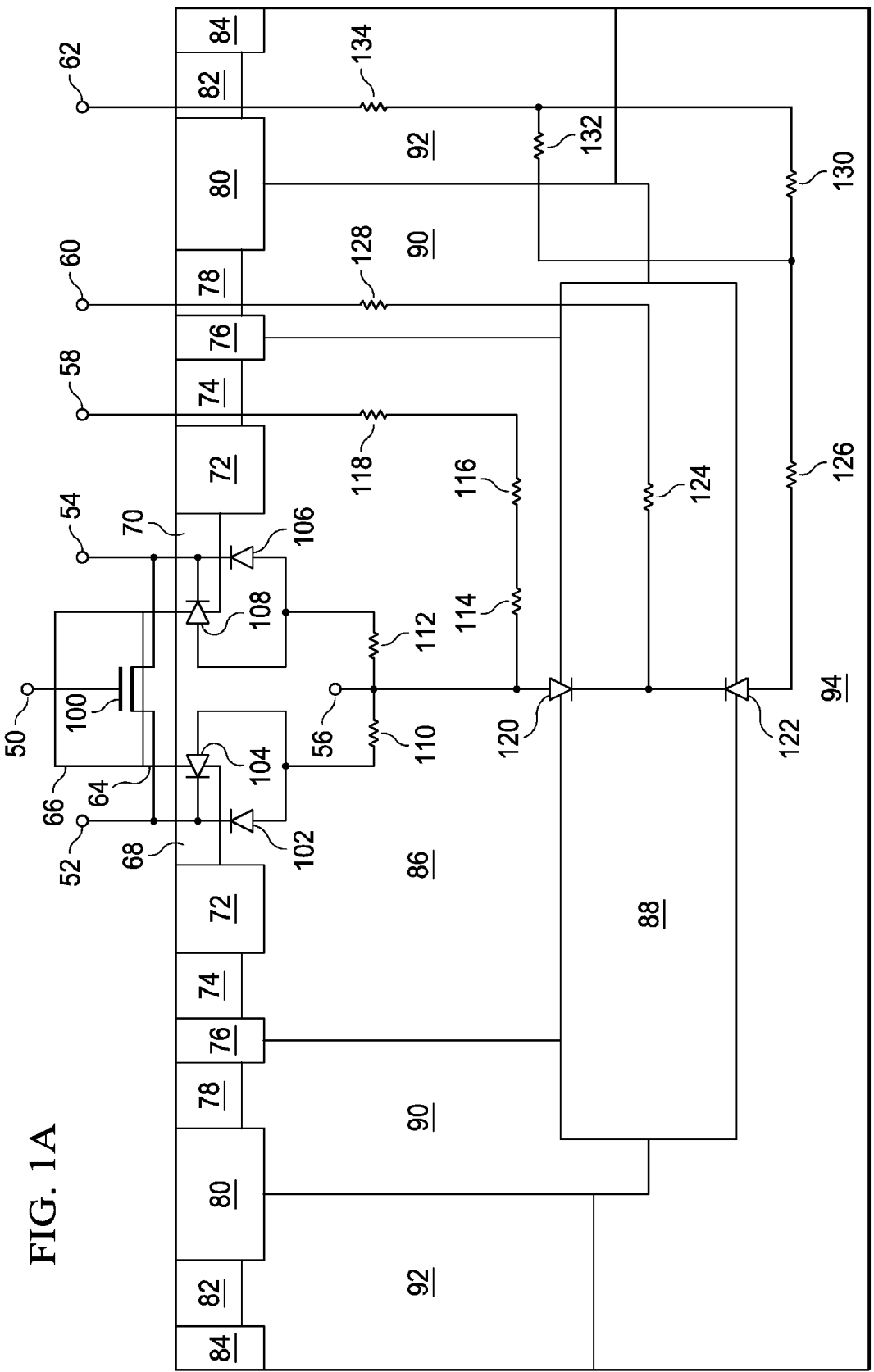
FIGS. 1A and 1B are an n-channel field effect transistor (NFET) and a p-channel field effect transistor (PFET), respectively, and their equivalent multi-terminal model circuits according to an embodiment.

FIG. 1A illustrates an n-channel field effect transistor (NFET) and its equivalent multi-terminal model circuit according to an embodiment. In this embodiment, the multi-terminal model is a six-terminal model (6T). The structure comprises a gate stack with a gate electrode 66 over a gate oxide 64. Source region 68 and drain region 70 are disposed on opposite sides of the gate stack in the substrate 94. The source region 68 and the drain region 70 are surrounded in the substrate by a first isolation region 72, such as a shallow trench isolation. A p+ doped body region 74 surrounds the first isolation region 72. A second isolation region 76 surrounds the body region 74. An n+ doped guard-ring 78 surrounds the second isolation region 76, and a third isolation region 80 surrounds the n+ doped guard-ring 78. A p+ doped guard-ring 82 surrounds the third isolation region 80, and a fourth isolation region 84 surrounds the p+ doped guard-ring 82.

Further disposed in the substrate 94 are a first p doped well 86, a deep n doped well 88, an n doped well 90, and a second p doped well 92. The n doped well 90 surrounds the first p doped well 86, and the deep n doped well 88 underlies the first p doped well 86 and adjoins the surrounding n doped well 90. The second p doped well 92 surrounds the n doped well 90. Accordingly, the n doped well 90 and the second p doped well 92 may act as guard-rings to aid in the suppression in the effects of noise. Further, the deep n doped well 88 may be used to facilitate isolating the body of the NFET from the remainder of the substrate 94.

Figure 2A:
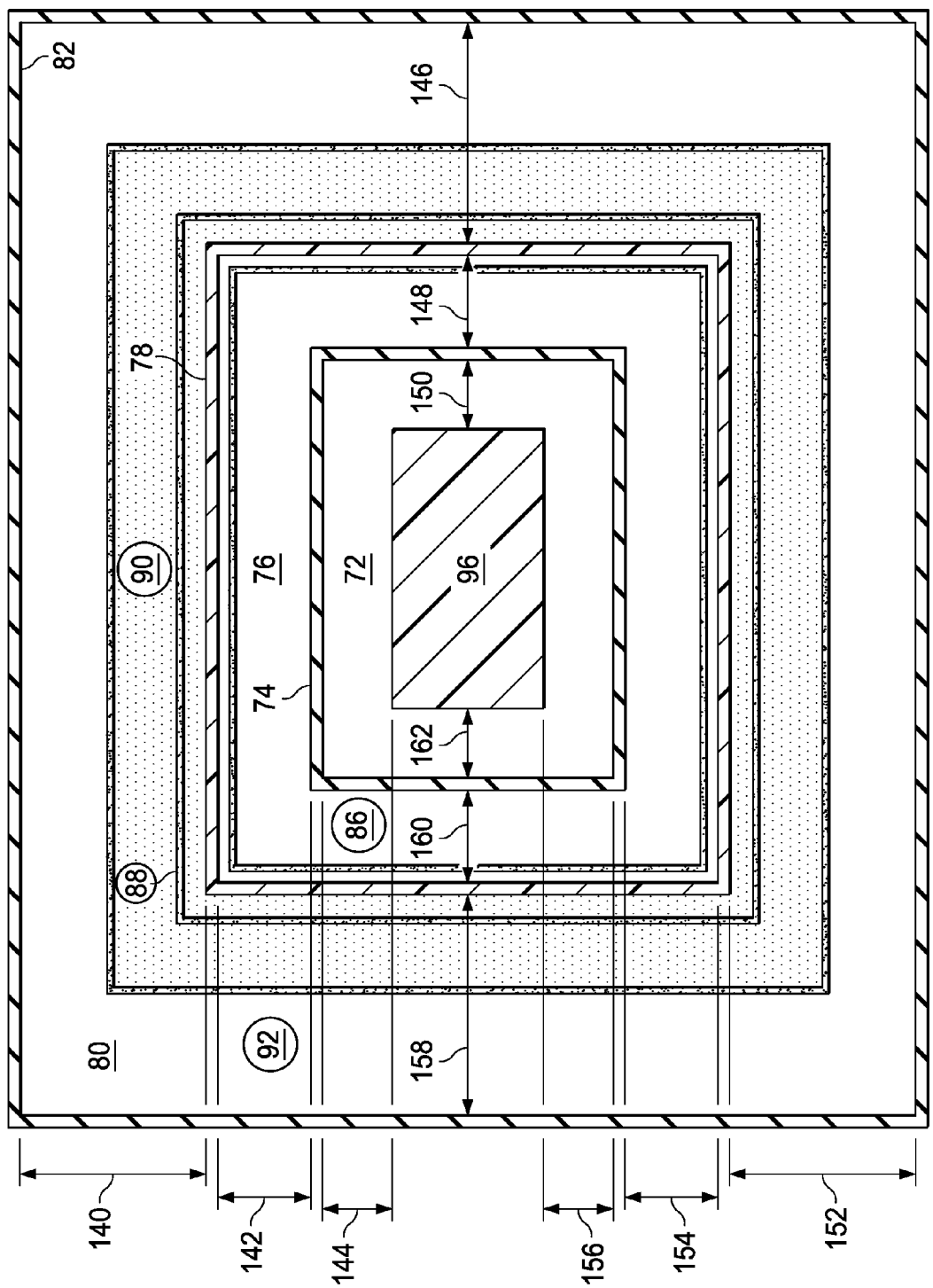
FIGS. 2A and 2B depict plan views of the transistors of FIGS. 1A and 1B, respectively.

FIG. 2A depicts a plan view of the NFET of FIG. 1A. The active device 96 comprises the source region 68, the drain region 70, and the gate stack. Subsurface features are indicated by a circled reference number. The boundary of the deep n doped well 88 overlaps with the n doped well 90.

Referring back to FIG. 1A, there is also shown the equivalent circuit of the structure, as may be modeled according to an embodiment. The equivalent circuit comprises a gate terminal 50, a source terminal 52, a drain terminal 54, a body terminal 58, an n guard-ring terminal 60, and a p guard-ring terminal 62. The circuit also comprises an ideal transistor 100, with a gate coupled to the gate terminal 50, a source coupled to the source terminal 52, a drain coupled to the drain terminal 54, and a body 56. Two diodes 104 and 102 each have a cathode coupled to the source terminal 52. Diode 104 represents the p-n junction at the interface of the channel region and the source region 68. Diode 102 represents the p-n junction at the interface of the first p doped well 86 and the source region 68. The anodes of the diodes 102 and 104 are coupled together and then to the body 56 through source-body resistor 110. Similarly, two diodes 106 and 108 each have a cathode coupled to the drain terminal 54. Diode 108 represents the p-n junction at the interface of the channel region and the drain region 70. Diode 106 represents the p-n junction at the interface of the first p doped well 86 and the drain region 70. The anodes of the diodes 106 and 108 are coupled together and then to the body 56 through drain-body resistor 112.

The body 56 is also coupled to a serially connected body resistor 114 and body-isolation resistor 116, and a body-connection resistor 118. The body-connection resistor 118 then couples to the body terminal 58. The body 56 is further coupled to the anode of a diode 120. Diode 120 represents the p-n junction of the first p doped well 86 and the deep n doped well 88. The cathode of the diode 120 is coupled to a deep well resistor 124, which is coupled to an n guard-ring resistor 128. The n guard-ring resistor 128 is coupled to the n guard-ring terminal 60. Referring back to diode 120, the cathode is also coupled to the cathode of diode 122. Diode 122 represents the p-n junction of the p type substrate 94 and the deep n well 88. The anode of diode 122 is coupled to a first substrate resistor 126, which is coupled to parallel second p well resistor 132 and a second substrate resistor 130. The parallel resistors 130 and 132 are then coupled to a p guard-ring resistor 134, which is then coupled to the p guard-ring terminal 62.

The equivalent circuit in FIG. 1A may model all of the substrate effects for the layout in FIG. 2A. A person having ordinary skill in the art may readily understand the effects of the layout in FIG. 2A on components in the modeled equivalent circuit in FIG. 1A. Some aspects of the layout that affects components are spacing, size, doping concentration, doping type, depth of some features, and the like. FIG. 2A illustrates some of the spacing that may affect the model. Spacings 144, 150, 156, and 162 are the upper, right, lower, and left spacings, respectively, between the active device 96 and the body region 74. Similarly, spacings 142, 148, 154, and 160 are the upper, right, lower, and left spacings, respectively, between the body region 74 and the n+ doped guard-ring 78. Likewise, spacings 140, 146, 152, and 158 are the upper, right, lower, and left spacings, respectively, between the n+ doped guard-ring 78 and the p+ doped guard-ring 82.

Figure 1B:
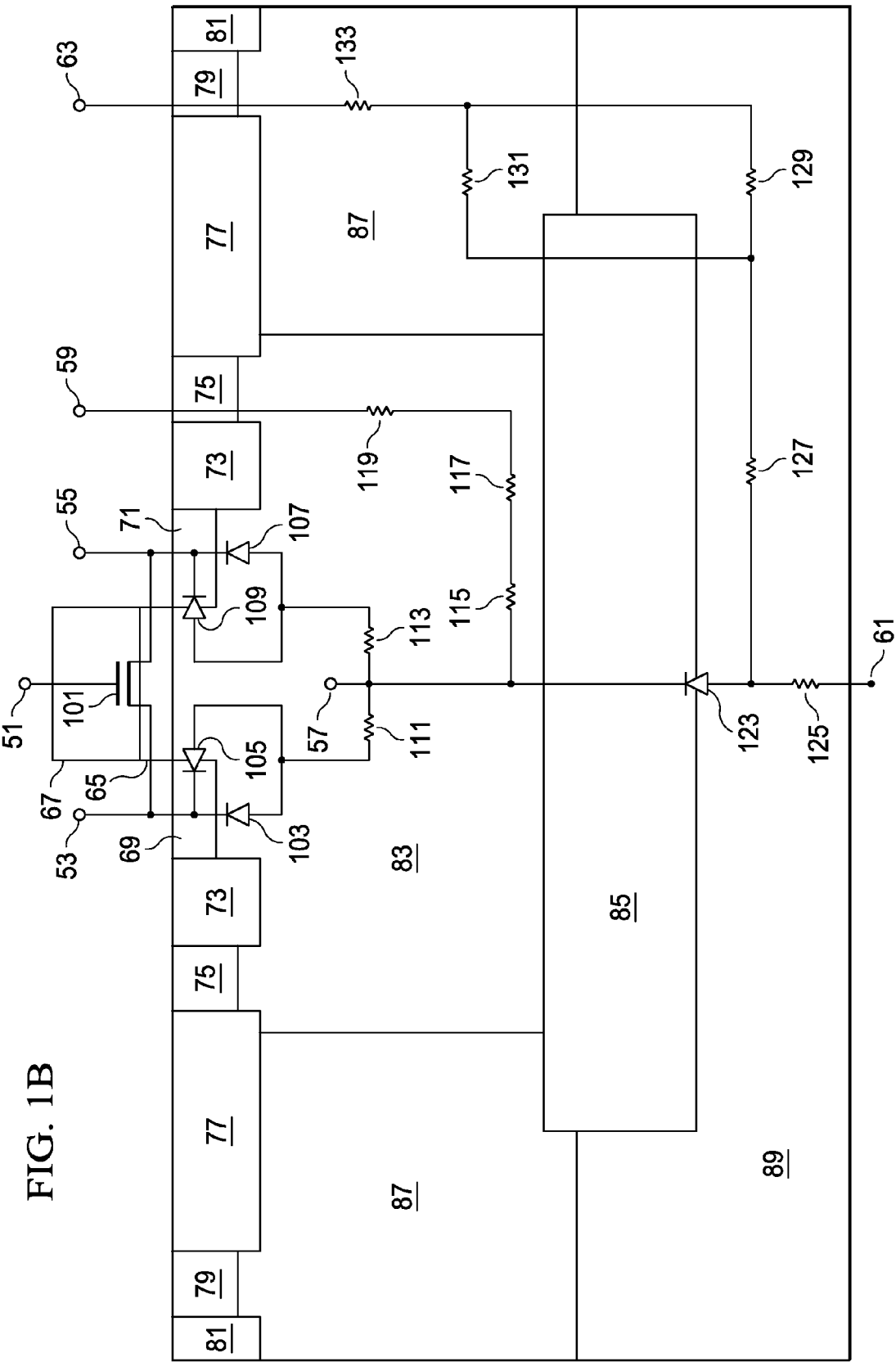

FIG. 1B illustrates a p-channel field effect transistor (PFET) and its equivalent multi-terminal model circuit according to an embodiment. In this embodiment, the multi-terminal model is a five-terminal model (5T). The structure comprises a gate stack with a gate electrode 67 over a gate oxide 65. Source region 69 and drain region 71 are disposed on opposite sides of the gate stack in the substrate 89. The source region 69 and the drain region 71 are surrounded in the substrate by a first isolation region 73, such as a shallow trench isolation. An n+ doped body region 75 surrounds the first isolation region 73. A second isolation region 77 surrounds the body region 75. A p+ doped guard-ring 79 surrounds the second isolation region 77, and a third isolation region 81 surrounds the p+ doped guard-ring 79.

Further disposed in the substrate 89 are an n doped well 83, a deep n doped well 85, and a p doped well 87. The p doped well 87 surrounds the n doped well 83, and the deep n doped well 85 underlies the n doped well 83 and partially underlies and adjoins the surrounding p doped well 87. Accordingly, the p doped well 87 may act as a guard-ring to aid in the suppression in the effects of noise. Further, the deep n doped well 85 may be used to facilitate isolating the body of the PFET from the remainder of the substrate 89.

Figure 2B:
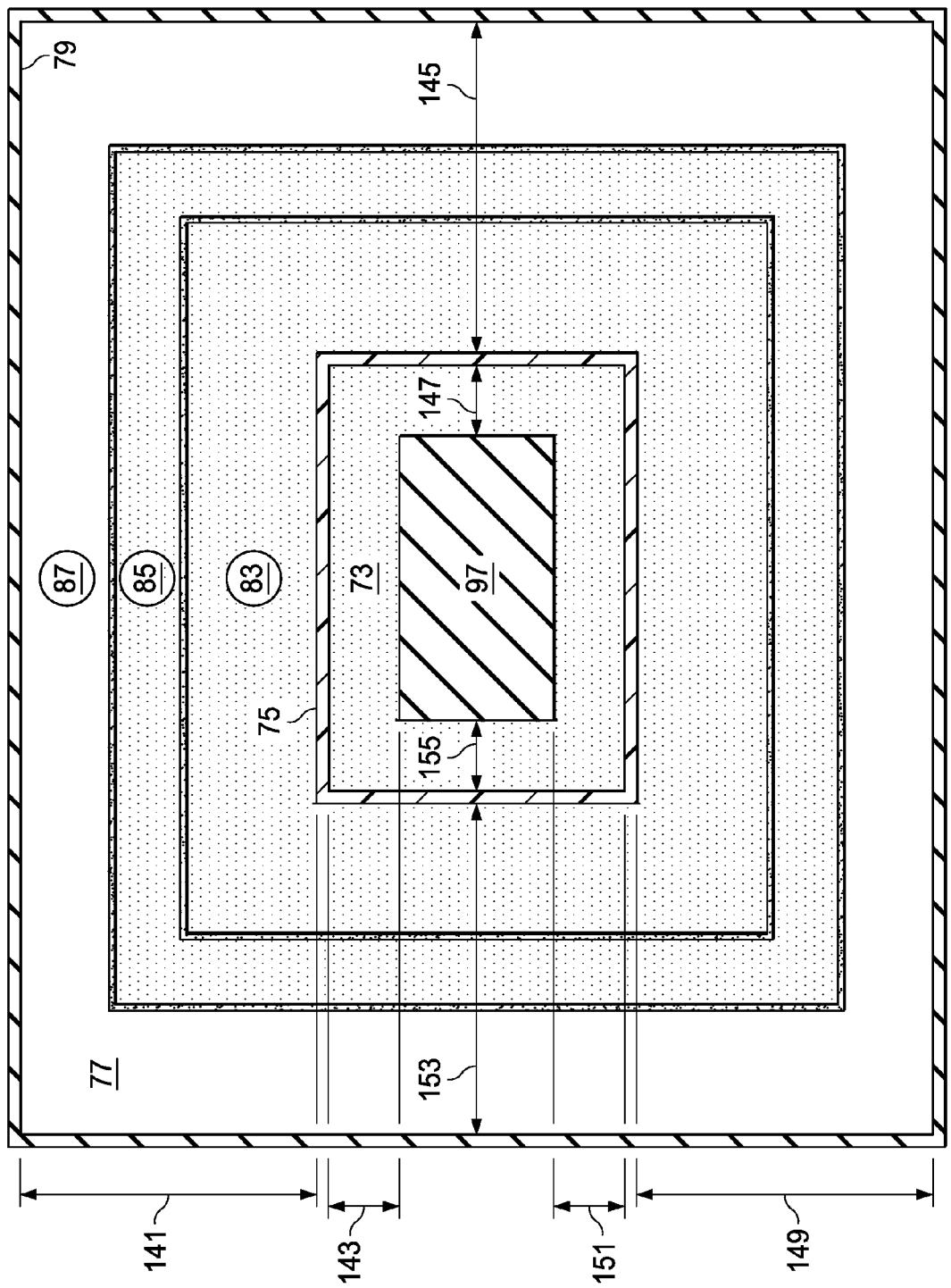

FIG. 2B depicts a plan view of the PFET of FIG. 1B. The active device 97 comprises the source region 69, the drain region 71, and the gate stack. Subsurface features are indicated by a circled reference number. The boundary of the deep n doped well 85 overlaps with the p doped well 87.

Referring back to FIG. 1B, there is also shown the equivalent circuit of the structure, as may be modeled according to an embodiment. The equivalent circuit comprises a gate terminal 51, a source terminal 53, a drain terminal 55, a body terminal 59, and a p guard-ring terminal 63. The circuit also comprises an ideal transistor 101, with a gate coupled to the gate terminal 51, a source coupled to the source terminal 53, a drain coupled to the drain terminal 55, and a body 57. Two diodes 105 and 103 each have a cathode coupled to the source terminal 53. Diode 105 represents the p-n junction at the interface of the channel region and the source region 69. Diode 103 represents the p-n junction at the interface of the n doped well 83 and the source region 69. The anodes of the diodes 103 and 105 are coupled together and then to the body 57 through source-body resistor 111. Similarly, two diodes 107 and 109 each have a cathode coupled to the drain terminal 55. Diode 109 represents the p-n junction at the interface of the channel region and the drain region 71. Diode 107 represents the p-n junction at the interface of the n doped well 83 and the drain region 71. The anodes of the diodes 107 and 109 are coupled together and then to the body 57 through drain-body resistor 113.

The body 57 is also coupled to a serially connected body resistor 115, body-isolation resistor 117, and a body-connection resistor 119. The body-connection resistor 119 then couples to the body terminal 59. The body 57 is further coupled to the cathode of a diode 123. Diode 123 represents the p-n junction of the p type substrate 89 and the deep n doped well 85. The anode of diode 123 is coupled to a first substrate resistor 127, which is coupled to parallel second p well resistor 131 and a second substrate resistor 129. The parallel resistors 129 and 131 are then coupled to a p guard-ring resistor 133, which is then coupled to the p guard-ring terminal 63. The anode of diode 123 is further coupled to a third substrate resistor 125 that is coupled to a substrate terminal 61.

The equivalent circuit in FIG. 1B may model the substrate effects for the layout in FIG. 2B. A person having ordinary skill in the art may readily understand the effects of the layout in FIG. 2B on components in the modeled equivalent circuit in FIG. 1B. Some aspects of the layout that affects components are spacing, size, doping concentration, doping type, depth of some features, and the like. FIG. 2B illustrates some of the spacing that may affect the model. Spacings 143, 147, 151, and 155 are the upper, right, lower, and left spacings, respectively, between the active device 97 and the body region 75. Similarly, spacings 141, 145, 149, and 153 are the upper, right, lower, and left spacings, respectively, between the body region 75 and the p+ doped guard-ring 79.

The equivalent circuits and models in these manners may also be scalable and user friendly. The components of the models may be well known and easily understood, especially when creating a netlist. Further, the components may be easily altered to vary different features, such as channel width, channel length, guard-ring to guard-ring distance, etc., and may be scaled to different technology nodes.

Figure 3A:
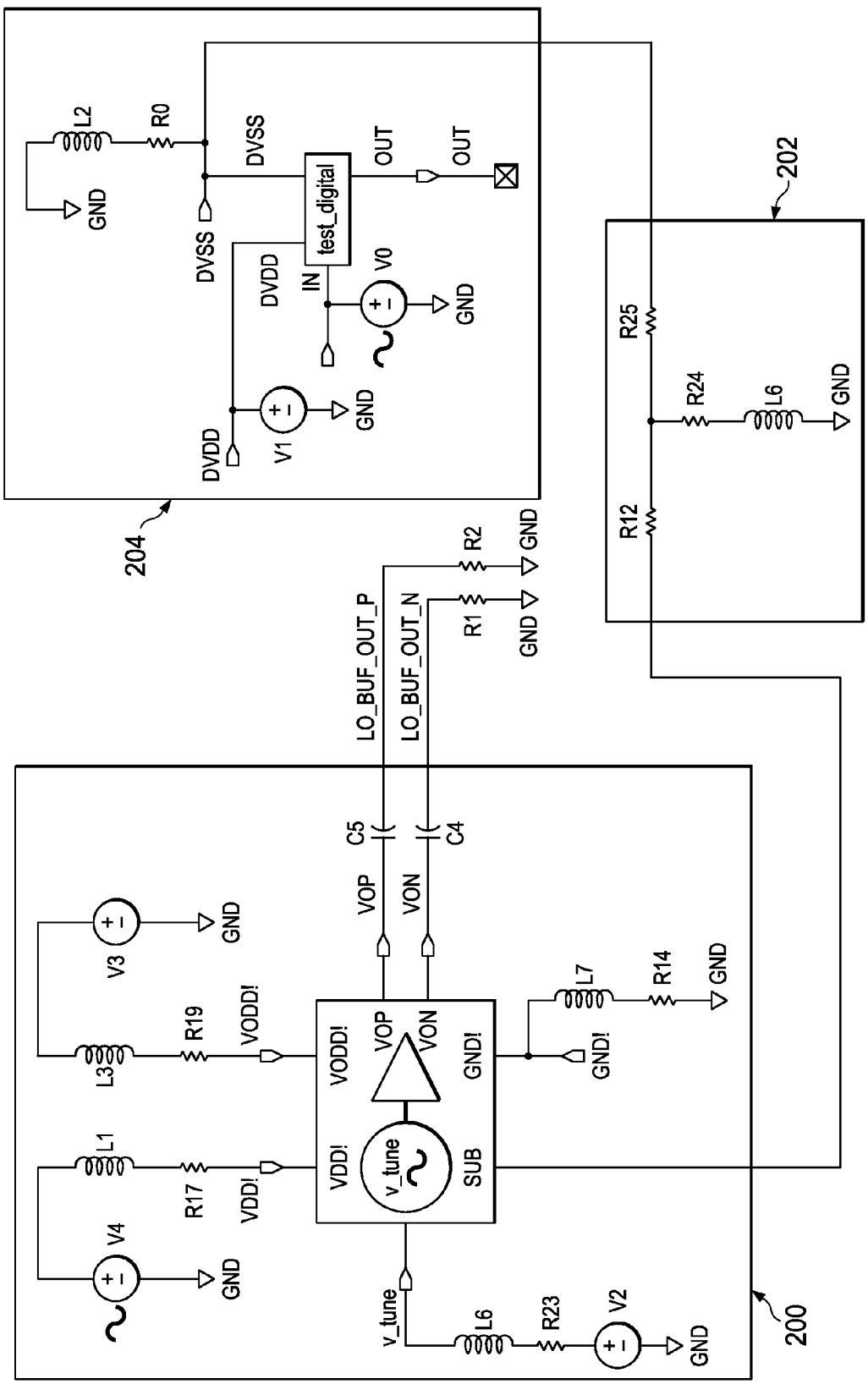
FIG. 3A is an exemplary circuit schematic according to an embodiment.
Figure 3B:
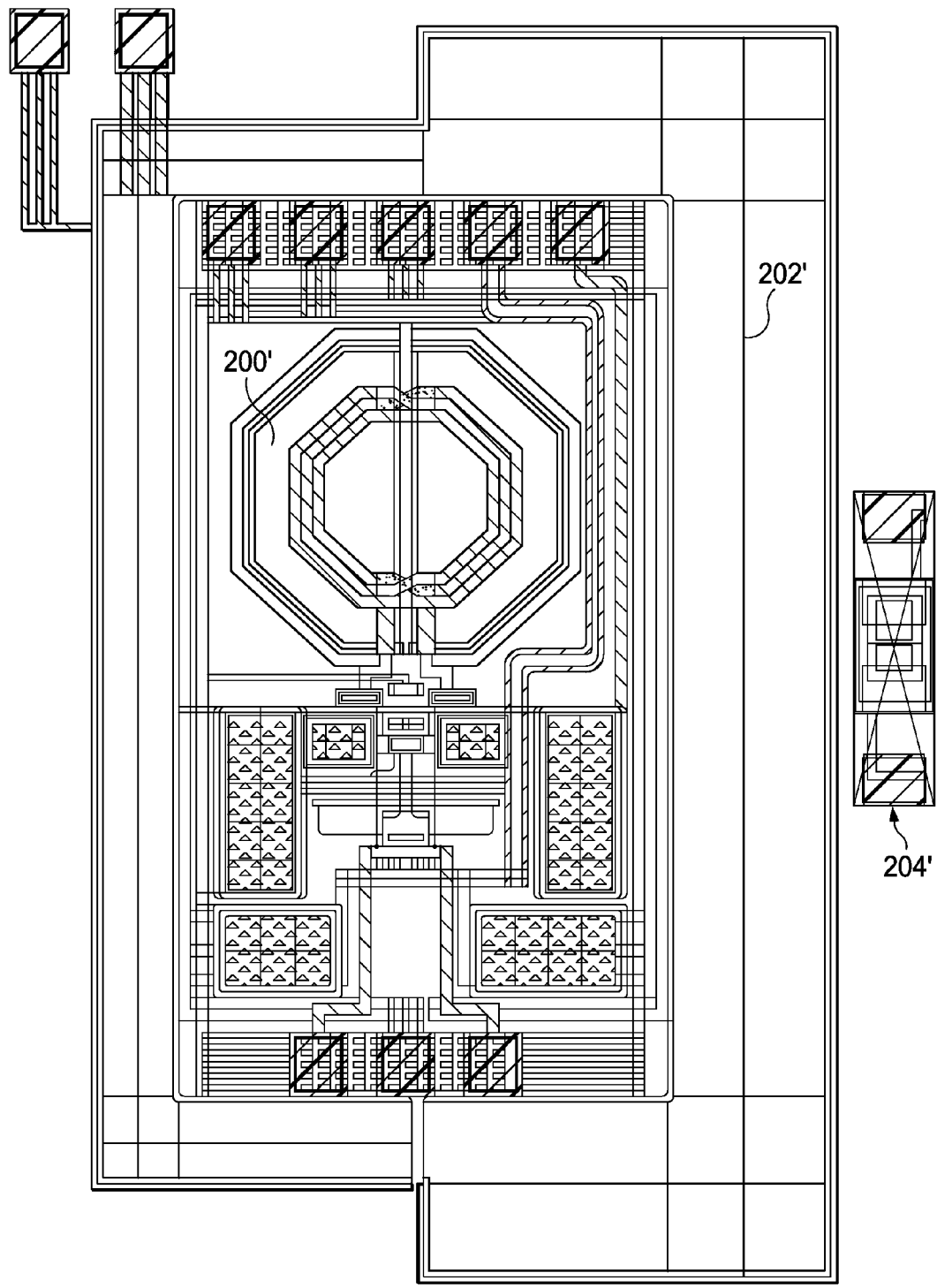
FIG. 3B is a preliminary expected layout represented by the circuit schematic in FIG. 3A.

A pre-layout circuit may use a multi-terminal model to simulate a circuit. The simulation may analyze the substrate noise generated during the simulated operation of the circuit. FIGS. 3A and 3C through 3I illustrate an example schematic and circuit using a multi-terminal model for simulation. FIG. 3A is a high level schematic of the LC tank VCO circuit, and FIG. 3B is the circuit layout using a multi-terminal model. FIG. 3A depicts the LC tank VCO 200, a substrate network 202, and an aggressor circuit 204. The aggressor circuit 204 in this example is an inverter, but may be any circuit that generates noise. The aggressor circuit 204 generates substrate noise to the LC tank VCO 200 during simulation, for example, as a worst case scenario for noise. Multiple aggressor circuits may be used in the schematic to create more noise.

The substrate network 202 couples the aggressor circuit 204 to the LC tank VCO 200 so the aggressor circuit may impart noise into the LC tank VCO 200. The substrate network 202 is a network based on an estimated layout die size and different possible guard-ring variations between the LC tank VCO 200 and the aggressor circuit 204. For context, FIG. 3B illustrates a possible layout that is represented by the schematic of FIG. 3A. FIG. 3B shows a LC tank VCO 200', a substrate or guard-ring 202' surrounding the LC tank VCO 200', and an aggressor circuit 204'. The substrate network 202 may comprise a τ-configuration. One branch of the configuration that is coupled to the LC tank VCO 200 comprises a resistor R12 that is also coupled to the interior node. Another branch that is coupled to the aggressor circuit 204 comprises a resistor R25 that is also coupled to the interior node. The last branch is coupled between the interior node and ground and comprises a serially connected resistor R24 and inductor L6.

FIGS. 3C through 3I illustrate example circuits a VCO 200 comprising multi-terminal models of transistors. The following discussion with respect to FIGS. 3C through 3I omits explicit description of many individual components in the schematics for brevity. A person having ordinary skill in the art would readily understand the components in each schematic that are not herein explicitly described, and would understand the components' functionality.

Figure 3C:
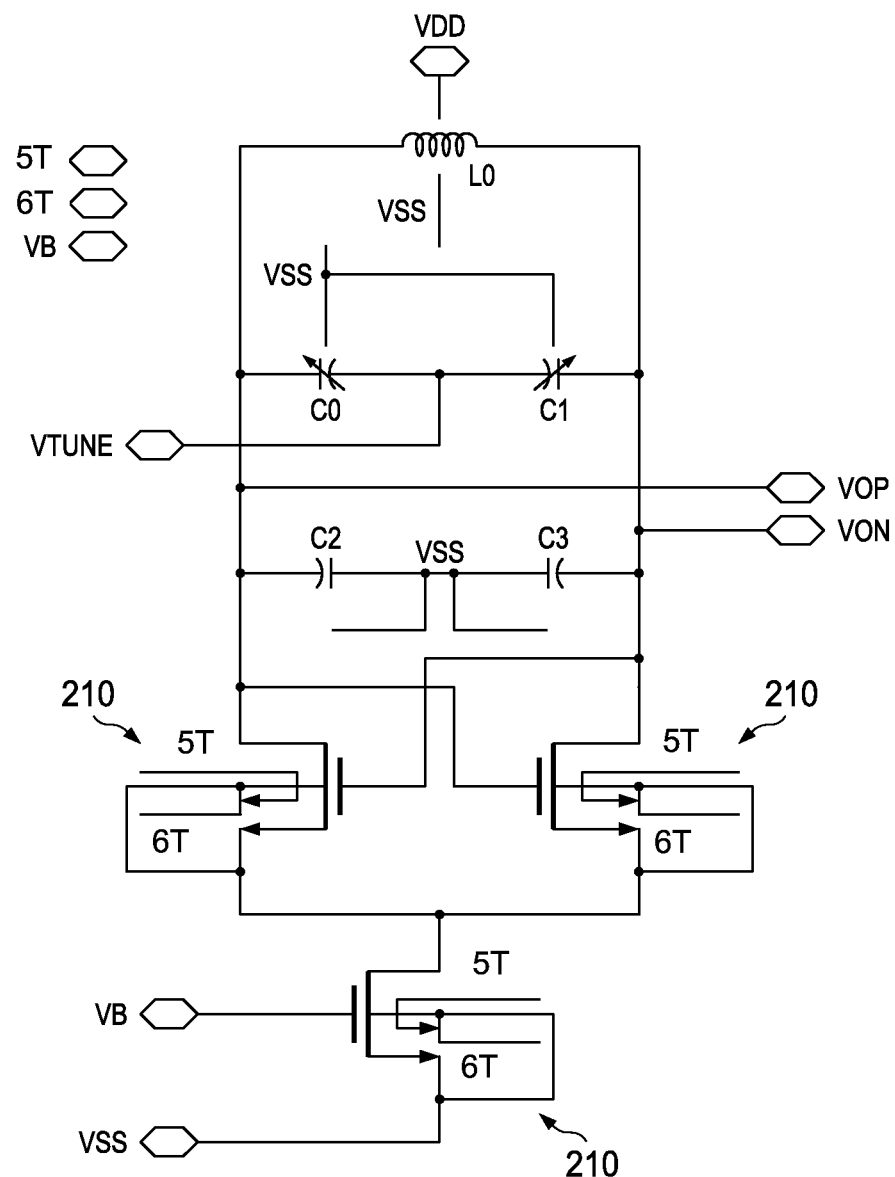
FIGS. 3C through 3I are example circuits of the LC tank VCO in FIG. 3A comprising a multi-terminal model.

In FIG. 3C, the circuit is configured in a typical NFET core current source to ground configuration but comprises transistors that are modeled by a 6T model 210 as discussed above with respect to FIG. 1A. The fifth terminal 5T and the sixth terminal 6T of each of the 6T models 210 are shown coupled to the substrate.

Figure 3D:
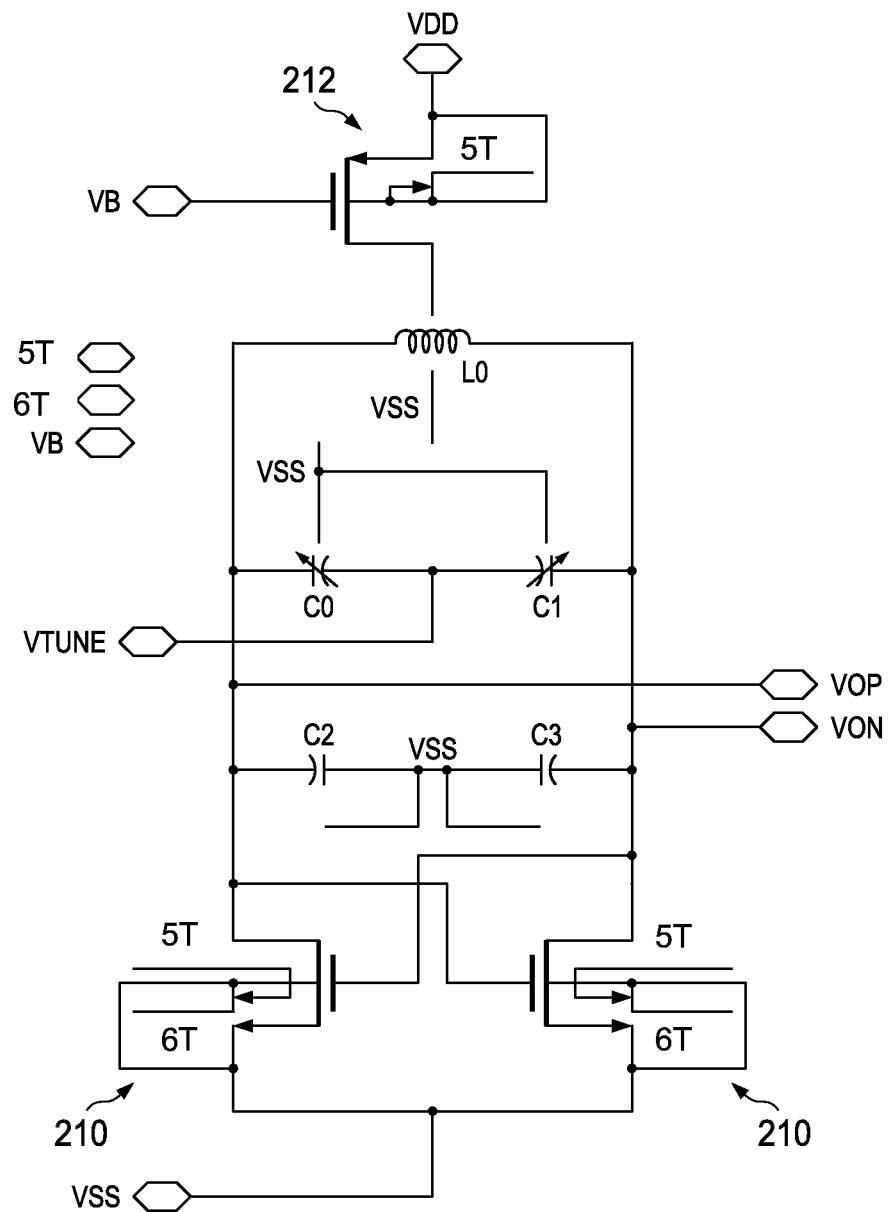

In FIG. 3D, the circuit is configured in an NFET core current source to supply configuration but comprises transistors that are modeled by a 6T model 210 as discussed above with respect to FIG. 1A and a 5T model 212 as discussed above with respect to FIG. 1B. The fifth terminal 5T of the 5T model 212 and the fifth terminal 5T and the sixth terminal 6T of each of the 6T models 210 are shown coupled to the substrate.

Figure 3E:
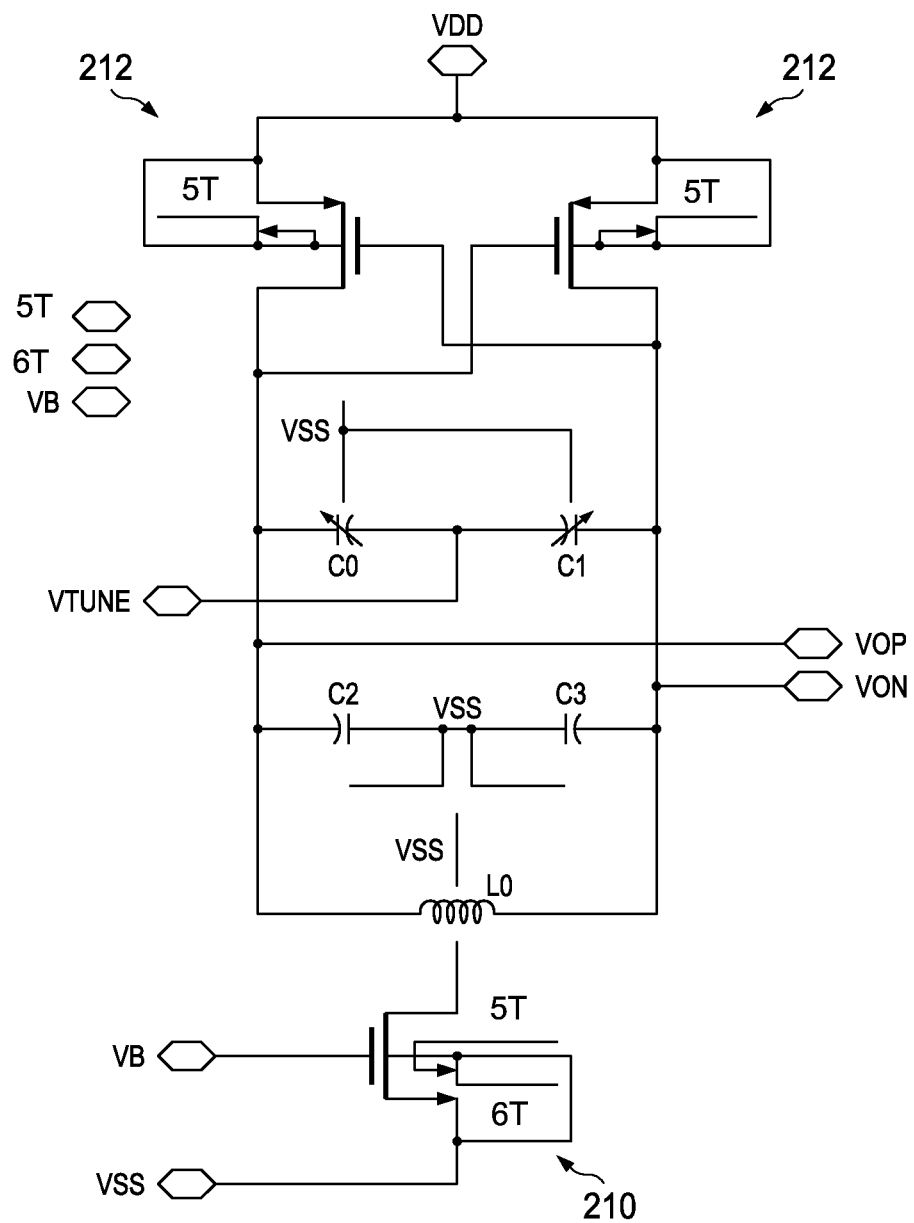
Figure 3F:
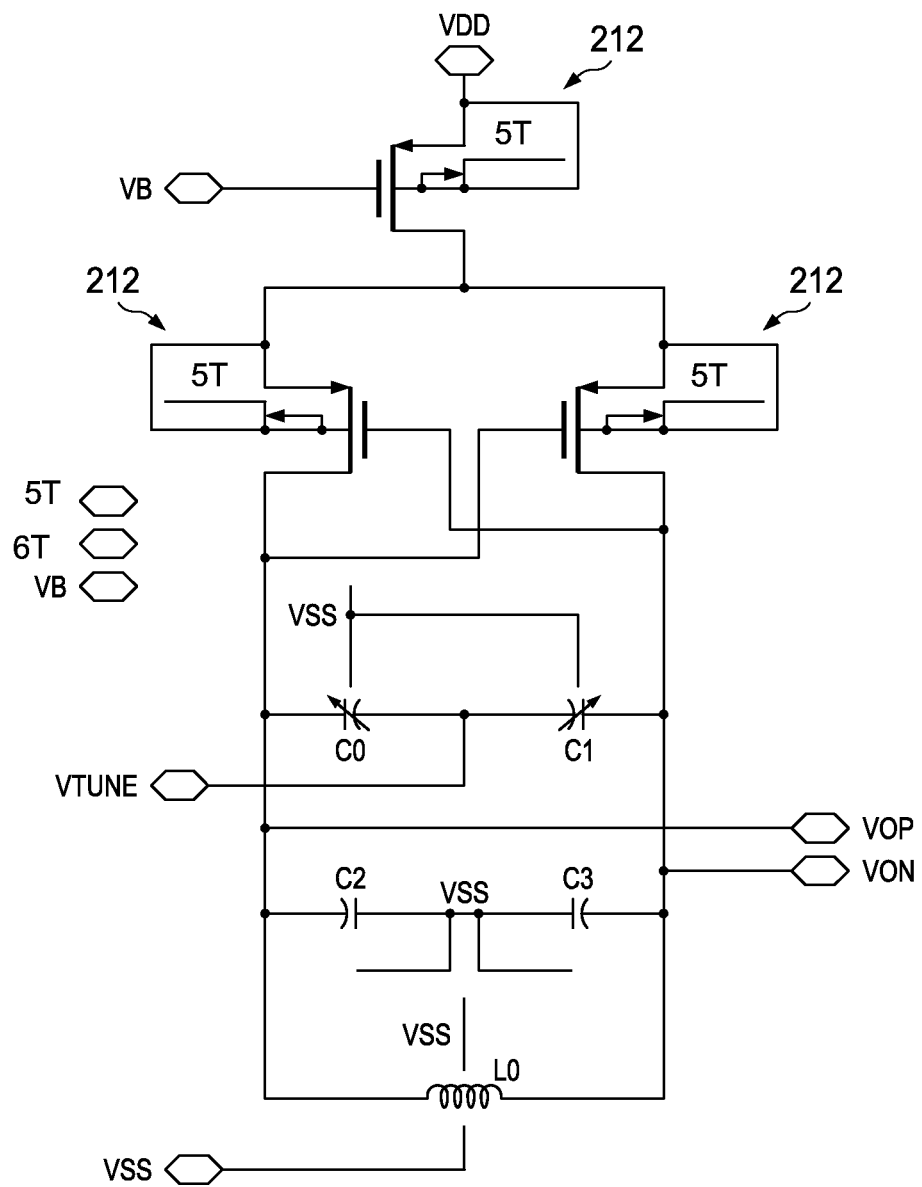

In FIG. 3E, the circuit is configured in a PFET core current source to ground configuration but comprises transistors that are modeled by a 5T model 212 as discussed above with respect to FIG. 1B and a 6T model 210 as discussed above with respect to FIG. 1A. In FIG. 3F, the circuit is configured in a typical PFET core current source to supply configuration but comprises transistors that are modeled by a 5T model 212 as discussed above with respect to FIG. 1B.

Figure 3G:
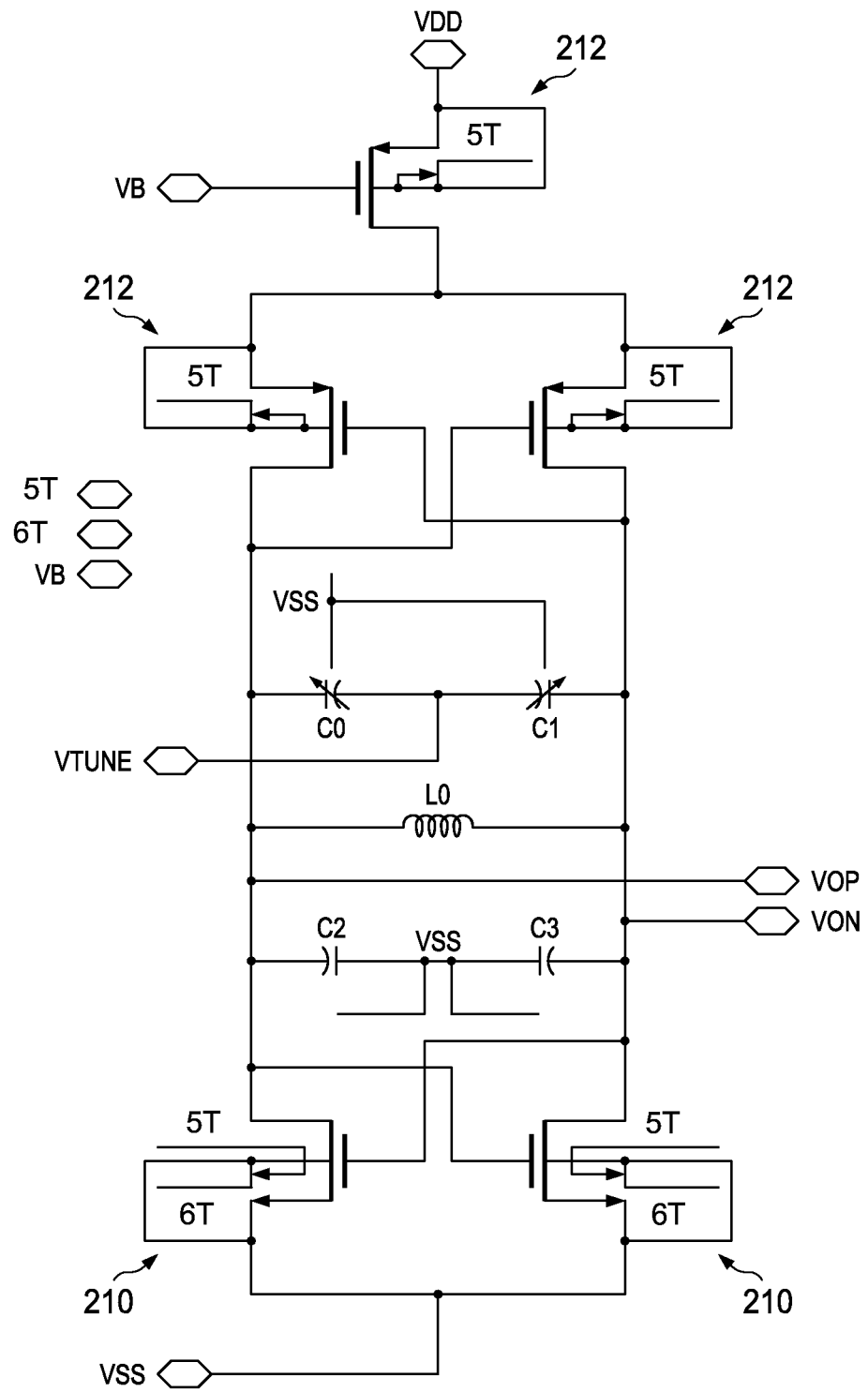
Figure 3H:
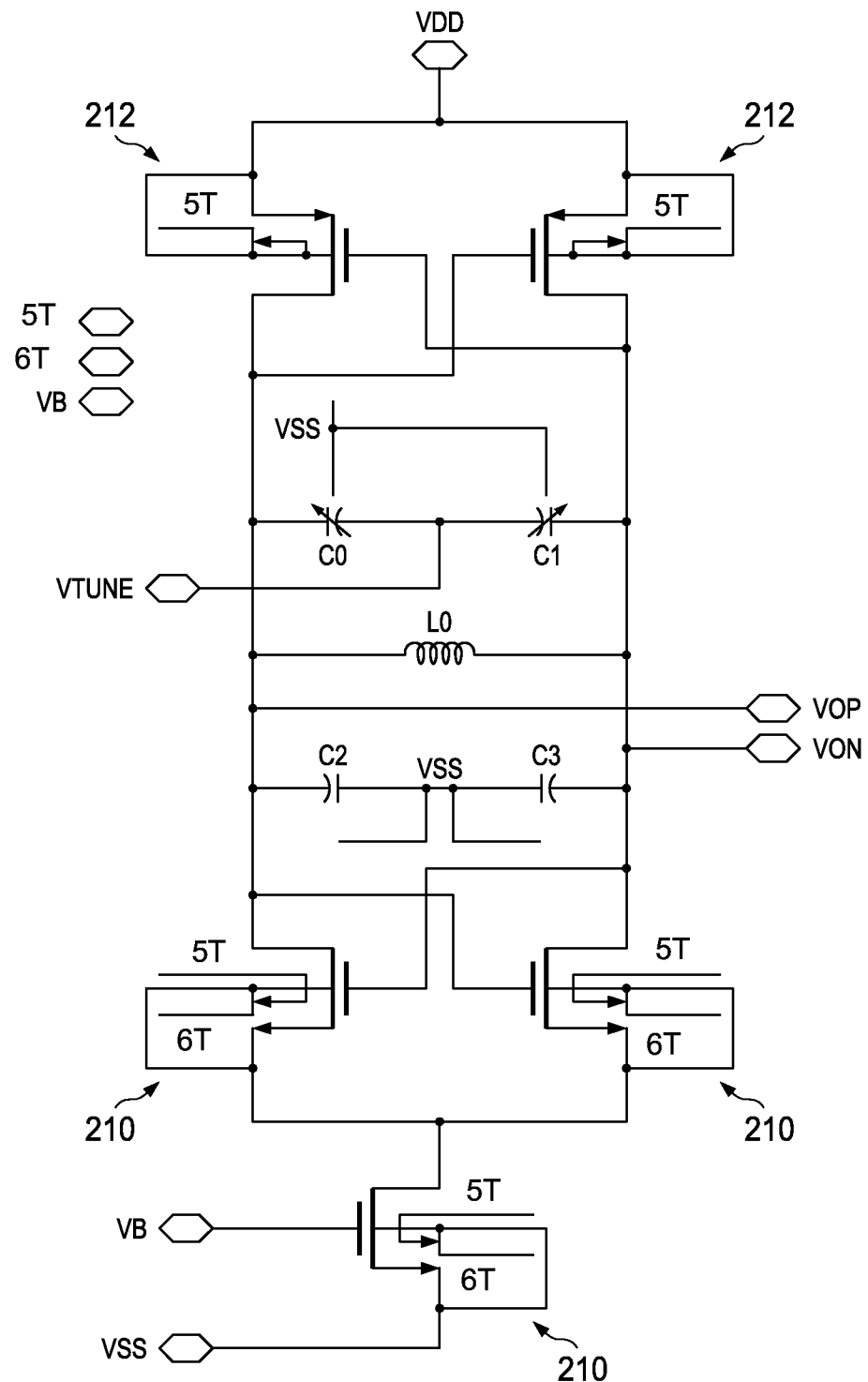
Figure 3I:
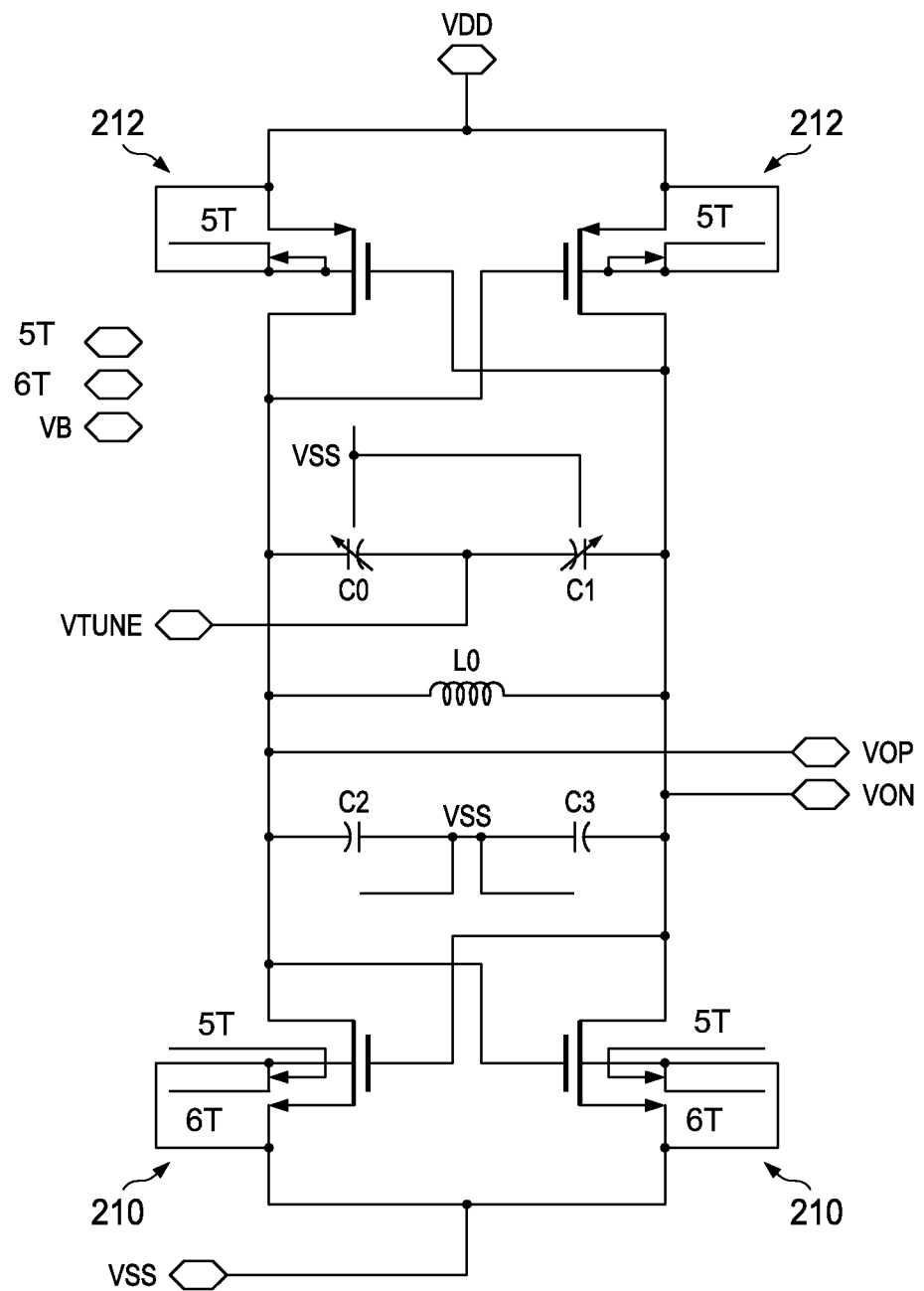

FIGS. 3G through 3I illustrate circuits that are modeled by a 6T model 210 as discussed above with respect to FIG. 1A and a 5T model 212 as discussed above with respect to FIG. 1B. FIG. 3G is a LC-complementary current source to supply VCO. FIG. 3H is a LC-complementary current source to ground VCO. FIG. 3I is a LC-complementary current reusing VCO.

The schematic and circuit of FIGS. 3A and 3B may be formed in an electronic file using a processor based system, i.e. a computer, running design software, such as one of the products from Cadence®. The schematic may be represented by and comprise a SPICE netlist. Each component of the schematic in FIG. 3A may be a subcircuit comprising another netlist. For example, the LC tank VCO 200 may be a subcircuit that represents one of the circuits in FIGS. 3C through 3I. The LC tank VCO 200 may further comprise other subcircuits comprising even more netlists. The multi-terminal model 210 and/or 212 may be described in a subcircuit netlist in order to represent the physical properties of the device and thus the equivalent circuit, like described above with regard to FIGS. 1A and 1B.

The substrate network 202 may also be represented by multiple netlists where each netlists includes a representation of some variation of a physical component. For example, each netlist may alter the electrical properties of the substrate network 202 to represent different distances between the LC tank VCO 200 and the aggressor circuit 204, different dopant concentrations of the substrate, different dopant types, or any combination of these characteristics. This may help model effects of different guard-ring structures. These schematics and circuits may be formed before the integrated circuit layout is designed, such that the circuit is said to be a pre-layout circuit.

The circuit in the electronic file may then be simulated in a processor based system, such as a computer, running simulation software, again such as one of the products from Cadence®. If multiple substrate network 202 netlists are used, each netlist may be simulated separately.

Figure 4:
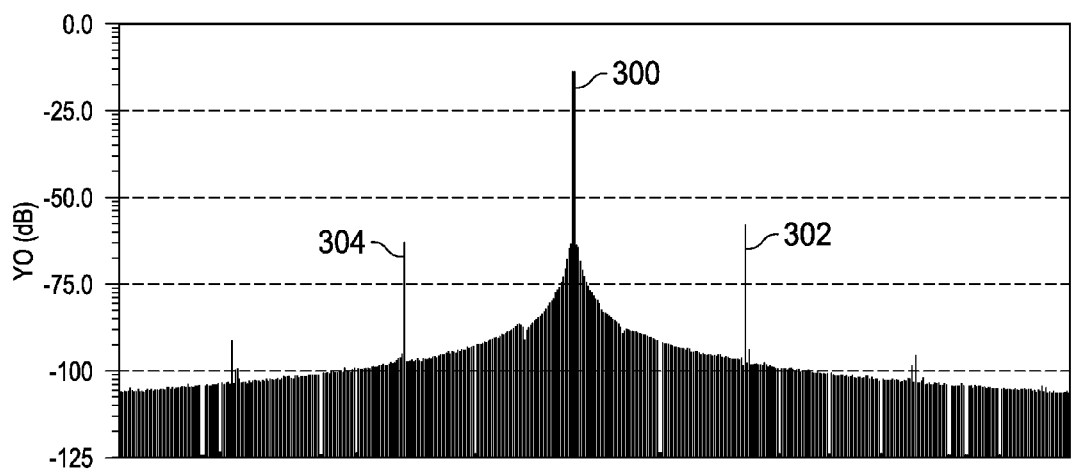
FIG. 4 is an example of a graph obtained by simulating the circuit schematic in FIG. 3A.

From the simulation, data may be obtained to determine the noise resulting in the circuit. The data may be represented in a plot, such as the example in FIG. 4, or tabular in nature. The data may be obtained by analyzing an output signals from the circuit during the simulation. By analyzing this signal, the substrate noise may be predicted. FIG. 4 illustrates an example of a plot of the magnitude of the signal for a particular frequency range at one terminal of the circuit. Peak 300 is the desired carrier frequency to be generated by the LC tank VCO. Peaks 302 and 304 are spurs caused by substrate noise and a subsequent mixing step. In this example, the spurs are approximately −47.1 dBc (decibels relative to the carrier).

If the noise is at too high of a level, features of the device may be modified in order to reduce the noise, such as the width of a guard-ring, a spacing, doping concentrations, depths of a guard-ring, or the like. If the noise is not too high, no modification may be needed. If multiple substrate network 202 netlists are simulated, the modification may be made by merely choosing a device represented by a netlist that has noise that is not too high.

Figure 5:
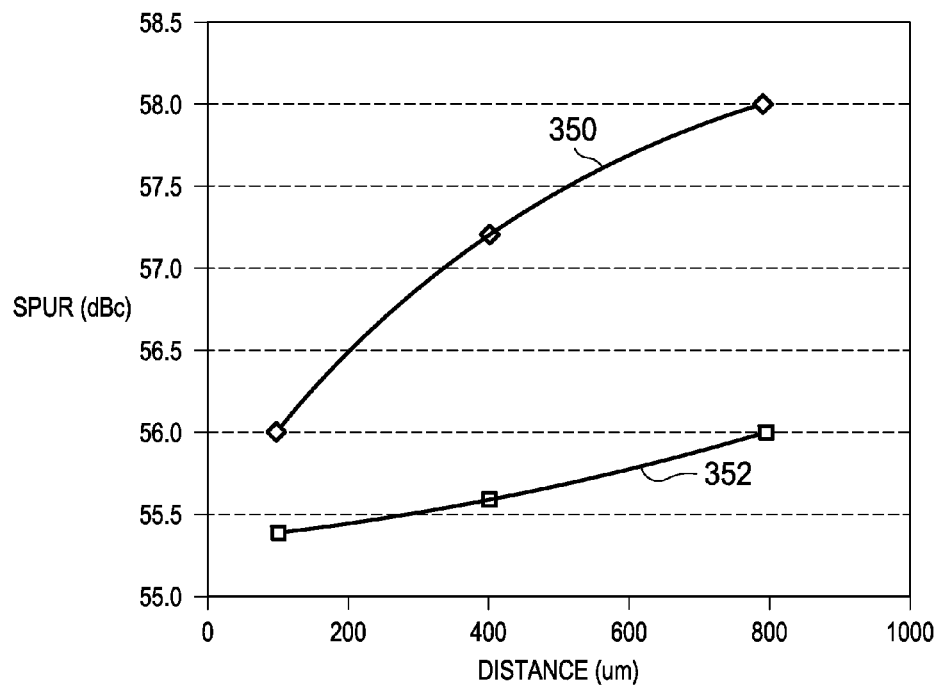
FIG. 5 is an example of a graph obtained by varying physical properties of a substrate network in FIG. 3A.

FIG. 5 is an example of how changing features of the device may reduce substrate noise. The y-axis is the magnitude of decibels relative to the carrier of the spurs, and the x-axis is the distance, in micrometers, between the LC tank VCO 200 and the aggressor circuit 204, such as that shown in FIG. 3B. Line 350 is the resulting noise as measured in decibels relative to the carrier for give distances between the LC tank VCO 200 and the aggressor circuit 204 with only an intrinsic silicon substrate, i.e. without any doping, and line 352 is the resulting noise with a p+ doped guard-ring between the LC tank VCO 200 and the aggressor circuit 204. As can be seen from the graph, as the distance increases, the magnitude of the decibels relative to the carrier of the spurs increases, thus decreasing the noise.

Different connections to a transistor device in the LC tank VCO 200 may also be simulated to determine desirable connections of the transistor device for a give application. For example, FIG. 6 lists the results of simulations when a transistor device modeled by the 6T model has different connections. "6T" indicates the sixth terminal, i.e. the p guard-ring terminal 62 in FIG. 1. "5T" indicates the fifth terminal, i.e. the n guard-ring terminal 60. "4T" indicates the fourth terminal, i.e. the body terminal 58. The rows below the 4T, 5T, and 6T indicate connections, directly or indirectly, to each respective terminal for a simulation. The "A" indicates a connection to the aggressor circuit 204, the "V" indicates a connection to the positive power supply VDD, the "F" indicates a floating state, "VSS" indicates a connection to a negative power supply VSS, and "Source" indicates a connection to the source of the transistor. The other three columns indicate the power ratio of the VCO output tone, the highest level noise spur, and the level of the spur relative to the VCO output tone.

With a modified device, if needed, an entire circuit layout may be designed and verified using known techniques in the art. With the substrate noise analysis being accomplished before the layout design, the verification process may be simplified by reducing complications in the prior art netlists and re-design time when the substrate noise is too high. Further, this substrate noise analysis considers all of the effects of the substrate noise by use of the above multi-terminal equivalent circuit models such that the simulation can more accurately predict the effects of substrate noise. Also, the impacts of VDD/VSS bounce are included within the model.

Once the layout has been verified, it may be implemented using standard semiconductor processing techniques, such as lithography, ion implantation, deposition, and etching. Thus, the layout may be used to realize a semiconductor chip with low substrate noise.

Figures 6, 7:
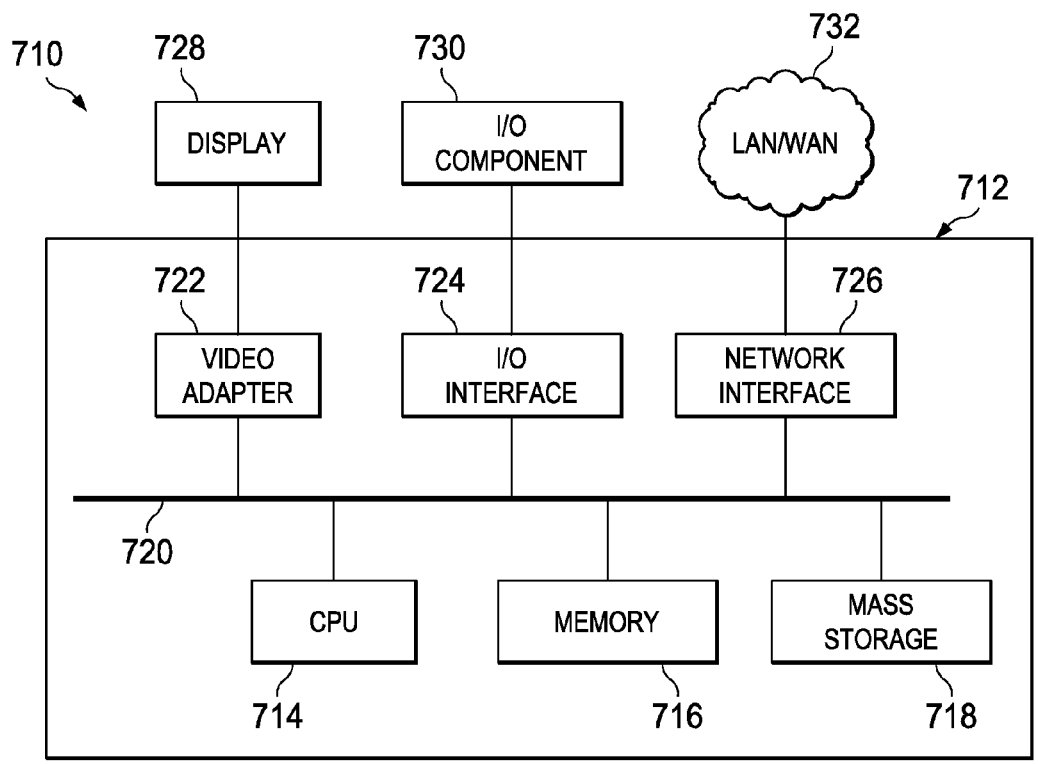
FIG. 6 is an example of a table obtained by varying physical connections of a six-terminal (6T) model in FIG. 3A.
FIG. 7 is a processor based system according to an embodiment.

Referring now to FIG. 7, a block diagram of a processor based system 710 is provided in accordance with an embodiment. The processor based system 710 is a general purpose computer platform and may be used to implement any or all of the processes discussed herein. The processor based system 710 may comprise a processing unit 712, such as a desktop computer, a workstation, a laptop computer, or a dedicated unit customized for a particular application. The processor based system 710 may be equipped with a display 728 and one or more input/output (I/O) devices 730, such as a mouse, a keyboard, or printer. The processing unit 712 may include a central processing unit (CPU) 714, memory 716, a mass storage device 718, a video adapter 722, and an I/O interface 724 connected to a bus 720.

The bus 720 may be one or more of any type of several bus architectures including a memory bus or memory controller, a peripheral bus, or video bus. The CPU 714 may comprise any type of electronic data processor, and the memory 716 may comprise any type of system memory, such as static random access memory (SRAM), dynamic random access memory (DRAM), or read-only memory (ROM).

The mass storage device 718 may comprise any type of storage device configured to store data, programs, and other information and to make the data, programs, and other information accessible via the bus 720. The mass storage device 718 may comprise, for example, one or more of a hard disk drive, a magnetic disk drive, or an optical disk drive.

The video adapter 722 and the I/O interface 722 provide interfaces to couple external input and output devices to the processing unit 712. As illustrated in FIG. 7, examples of input and output devices include the display 728 coupled to the video adapter 722 and the I/O device 730, such as a mouse, keyboard, printer, and the like, coupled to the I/O interface 724. Other devices may be coupled to the processing unit 712, and additional or fewer interface cards may be utilized. For example, a serial interface card (not shown) may be used to provide a serial interface for a printer. The processing unit 712 also may include a network interface 726 that may be a wired link to a local area network (LAN) or a wide area network (WAN) 732 and/or a wireless link.

It should be noted that the processor based system 710 may include other components. For example, the processor based system 710 may include power supplies, cables, a motherboard, removable storage media, cases, and the like. These other components, although not shown, are considered part of the processor based system 710.

Embodiments are implemented on the processor based system 710, such as by program code executed by the CPU 714, for example a simulation program such as Cadence®. For example, any of the netlists may be created using the processor based system 710, which may include downloading netlists from a remote location such as a database, accessing netlists from memory 716 or mass storage 718, or creating netlists by input of a user using the I/O interface 724 and video adapter 722. Further, the simulation may occur using the CPU 714 or remotely through the network interface 726. During the simulation, the netlists may be accessed from memory 716, mass storage 718, or a remote location. Other possible implementations of embodiments are not expressly discussed herein, but a person having ordinary skill in the art will readily understand the application of the above and below described processes in the processor based system 710.

Figure 8:
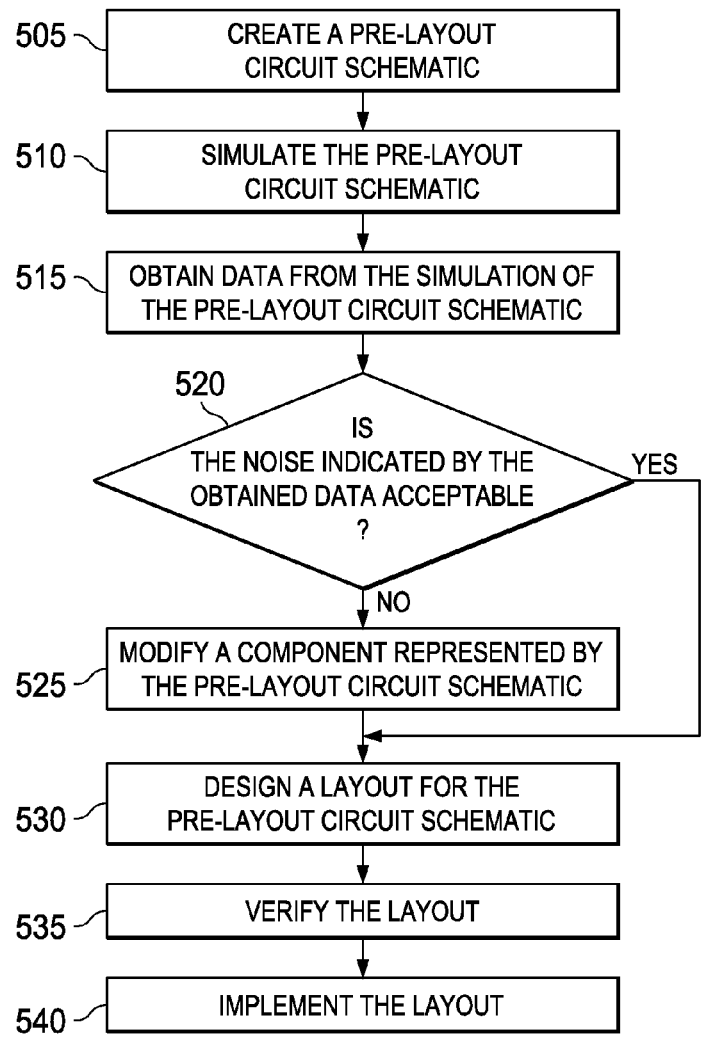
FIG. 8 is a method for substrate noise analysis according to an embodiment.

FIG. 8 is a flowchart of an embodiment. In step 505, a pre-layout circuit schematic is created, for example, by creating an electronic file on a processor based system running design software. The electronic file may comprise netlists representing the pre-layout circuit schematic or individual components of the pre-layout circuit schematic. The pre-layout circuit schematic may comprise components such as an aggressor circuit, like an inverter, coupled to another desired circuit, such as an LC tank VCO, through a substrate network. In this configuration, the aggressor circuit may cause substrate noise during simulation.

Figure 9:
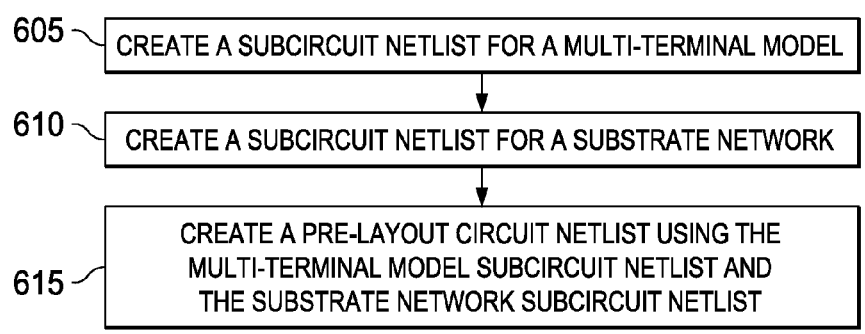
FIG. 9 is a method for creating a circuit schematic according to an embodiment.

FIG. 9 is an exemplary process for creating a pre-layout circuit schematic in step 505. In step 605, a multi-terminal model for a device in the pre-layout circuit schematic is created. This may comprise creating a netlist representing the multi-terminal model of the device, where the netlist includes characteristics of the device based on physical features of the device. For example, similar to FIGS. 1A and 1B, the netlist may comprise resistors based on the substrate features, such as sheet resistance, doping type, doping concentration, distances, spacings, depths, or the like, and may comprise diodes at p-n junctions. The netlist may indicate that the resistors and diodes are coupled to nodes in a manner similar to FIGS. 1A and 1B. Further, the terminals of the multi-terminal model may comprise or consist of a gate terminal, a source terminal, a drain terminal, a body terminal, a p+ guard-ring terminal, and an n+ guard-ring terminal.

In step 610, a substrate network coupling the desired circuit to an aggressor circuit is modeled to represent the substrate effects of a possible represented layout. This may comprise creating a netlist representing the substrate network. For example, the netlist may comprise a first resistor coupled between a node that couples the desired circuit and an interior node, a second resistor coupled between a node that couples the aggressor circuit and the interior node, a third resistor coupled between the interior node to an inductor, and the inductor further coupling ground. Thus, the netlist may represent a τ-configuration for the substrate network, like the network illustrated in FIG. 3A. Further, step 610 may comprise creating multiple netlists where each netlist varies in some manner from the others. For example, a network represented by a single netlist may vary a single physical characteristic of the substrate from other netlists such that the representative components of the network are varied accordingly. Further, each netlist may vary multiple physical characteristics of the network. For example, netlists may represent varying doping concentration of a guard-ring, varying distances or spacings between the desired circuit and the aggressor, and/or varying types of guard-rings. Any combination of physical characteristics may be varied within any netlists.

In step 615, the pre-layout circuit is created by using the multi-terminal model netlist and the substrate network netlist. For example, these can be configured in a pre-layout circuit netlist in a similar manner as depicted in FIGS. 3A and 3C.

Referring back to FIG. 8, in step 510, the pre-layout circuit schematic is simulated, for example, by using a processor based system running simulation software. The desired circuit's output may be analyzed in the frequency domain to determine the magnitude, in dBm, of the frequency components of the output. For example, if the desired circuit is an LC tank VCO, the LC tank VCO may be simulated at a particular tuning voltage that results in a desired carrier frequency.

In step 515, data from the simulation is obtained. The data may be a frequency domain plot of an output signal indicating the magnitude of the frequency components. Referring back to the LC tank VOC example, the output of the LC tank VCO may be analyzed to determine the magnitude of the carrier frequency with respect to other frequency components of the signal.

In step 520, the data obtained in step 515 is analyzed to determine whether noise indicated by the data is acceptable. For example, the noise may be acceptable if a spur is less than some threshold of decibels relative to the carrier (dBc), whereas the noise may be unacceptable if it is equal to or greater than the threshold. If the noise not acceptable, in step 525, a component or components of the device that was represented by the multi-terminal model or of the substrate network are modified. The component that is modified may be modified in any manner to reduce the noise, for example, by widening a guard-ring, increasing the depth of a guard-ring, increasing the distance of the guard-ring from the active device, and the like. Also, if netlists were used that represented variations to different components, the device represented by a netlist that had an acceptable noise may be used for the subsequent layout design. Thus, physical features may be modified in a manner that reduces noise to an acceptable level.

After step 525 or after step 520 if the noise is acceptable, in step 530, a layout for the circuit is designed with the chosen physical components and features obtained and/or simulated in the multi-terminal model(s). This may be accomplished using a processor based system running circuit layout design software. In step 535, the layout is verified using a processor based system running verification software, such as an EDA. In step 540, the circuit layout is physically implemented by known semiconductor processing techniques.

Although embodiments and their advantages have been described in detail, it should be understood that various changes, substitutions and alterations can be made herein without departing from the spirit and scope as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to embodiments. Accordingly, the appended claims are intended to include within their scope such processes, machines, manufacture, compositions of matter, means, methods, or steps.

What is claimed is:

1. A method for substrate noise analysis, the method comprising:
using a first processor based system, creating a circuit schematic comprising a first circuit, an aggressor circuit, and a substrate network coupling the first circuit to the aggressor circuit, wherein the first circuit comprises a transistor, an intra-transistor component being within the transistor, and wherein the substrate network is based on physical features of an expected die size;
using a second processor based system, simulating the circuit schematic thereby resulting in simulation results;
determining when the simulation results are unacceptable;
upon determining when the simulation results are unacceptable, modifying a representation of a physical feature of the intra-transistor component that is present in the circuit schematic during the simulating the circuit schematic, wherein the physical feature comprises at least one of:

a spacing between the intra-transistor component and another intra-transistor component,
a size of the intra-transistor component,
a doping concentration of the intra-transistor component,
a doping type of the intra-transistor component, or
a depth of the intra-transistor component; and
thereafter, creating a layout based on a plurality of properties represented in the circuit schematic.

2. The method of claim 1, wherein the substrate network comprises a τ-configuration, wherein a first branch comprises a first resistor coupled between a first exterior node of the substrate network and an interior node, a second branch comprises a second resistor coupled between a second exterior node and the interior node, and a third branch comprises a serially connected third resistor and inductor coupled between the interior node and a ground node.

3. The method of claim 1, wherein the simulation results include a graph of a magnitude of an output signal in a frequency domain.

4. The method of claim 1, wherein the representation of the physical feature of the intra-transistor component represents a guard-ring structure.

5. The method of claim 1, wherein the circuit schematic is represented by a circuit netlist, the first circuit is represented by a first subcircuit netlist, the aggressor circuit is represented by a second subcircuit netlist, the substrate network is represented by a third subcircuit netlist, and a multi-terminal model in the first circuit is represented by a fourth subcircuit netlist.

6. The method of claim 1 further comprising:
using a third processor based system, verifying the layout; and
implementing the layout on a semiconductor chip.

7. The method of claim 1, wherein the first circuit comprises a multi-terminal model of a transistor, wherein the multi-terminal model comprises a source terminal, a gate terminal, a drain terminal, a body terminal, and a guard-ring terminal.

8. A method for substrate noise analysis, the method comprising:
using a first processor based system, creating a circuit schematic comprising a first circuit, an aggressor circuit, and a substrate network coupling the first circuit to the aggressor circuit, wherein the substrate network is based on physical features of an expected die size, wherein the first circuit comprises a multi-terminal model of a transistor, wherein the multi-terminal model comprises a source terminal, a gate terminal, a drain terminal, a body terminal, and a guard-ring terminal;
using a second processor based system, simulating the circuit schematic thereby resulting in simulation results;
determining when the simulation results are unacceptable;
upon determining when the simulation results are unacceptable, modifying a component in the circuit schematic to modify at least one property represented in the circuit schematic; and
thereafter, creating a layout based on a plurality of properties represented in the circuit schematic.

9. The method of claim 8, wherein the substrate network comprises a τ-configuration, wherein a first branch comprises a first resistor coupled between a first exterior node of the substrate network and an interior node, a second branch comprises a second resistor coupled between a second exterior node and the interior node, and a third branch comprises a serially connected third resistor and inductor coupled between the interior node and a ground node.

10. The method of claim 8, wherein the simulation results include a graph of a magnitude of an output signal in a frequency domain.

11. The method of claim 8, wherein the component represents a guard-ring structure, and wherein the component is modified to represent a change in a doping concentration, a width, a depth, a doping type, or a combination thereof.

12. The method of claim 8, wherein the circuit schematic is represented by a circuit netlist, the first circuit is represented by a first subcircuit netlist, the aggressor circuit is represented by a second subcircuit netlist, the substrate network is represented by a third subcircuit netlist, and the multi-terminal model is represented by a fourth subcircuit netlist.

13. The method of claim 8 further comprising:
using a third processor based system, verifying the layout; and
implementing the layout on a semiconductor chip.

14. A method for substrate noise analysis, the method comprising:
creating a circuit schematic using a first processor based system, wherein the circuit schematic comprises a model representing physical properties of an expected layout, the circuit schematic comprising a transistor device, an intra-transistor component being within the transistor device;
simulating the circuit schematic using a second processor based system;
obtaining data from the simulating of the circuit schematic;
modifying a representation of a physical property of the intra-transistor component based on the data from the simulating, wherein the physical property of the intra-transistor component is at least one of the physical properties of the expected layout that is present during the simulating the circuit schematic, wherein the physical property of the intra-transistor component is at least one of:
a spacing between the intra-transistor component and another intra-transistor component,
a size of the intra-transistor component,
a doping concentration of the intra-transistor component,
a doping type of the intra-transistor component, or
a depth of the intra-transistor component; and
thereafter, creating a post-simulation layout based on the modifying of the intra-transistor component.

15. The method of claim 14, wherein the circuit schematic comprises a first circuit, an aggressor circuit, and a substrate network coupled between the first circuit and the aggressor circuit, wherein the first circuit comprises a multi-terminal model of a transistor that comprises a drain terminal, a gate terminal, a source terminal, a body terminal, and a guard-ring terminal, wherein each of the multi-terminal model and the substrate network represents at least some of the physical properties of the expected layout.

16. The method of claim 14, wherein the intra-transistor component is a guard-ring structure.

17. The method of claim 14, wherein the data includes a graph in a frequency domain of an output signal of the circuit schematic.

18. The method of claim 14, wherein creating the circuit schematic comprises creating a netlist.

19. The method of claim 14 further comprising:
verifying the post-simulation layout using a third processor based system; and
implementing the post-simulation layout on a semiconductor chip.

20. A method for substrate noise analysis, the method comprising:

using a first processor based system, creating a circuit schematic comprising a first circuit, an aggressor circuit, and a substrate network coupling the first circuit to the aggressor circuit, wherein the substrate network is based on physical features of a substrate, the circuit schematic being created without an initial layout of the substrate comprising the first circuit;

using a second processor based system, simulating the circuit schematic thereby resulting in simulation results;

determining when the simulation results are unacceptable;

upon determining when the simulation results are unacceptable, modifying a representation of a physical feature of a component in the circuit schematic; and thereafter, creating a post-simulation layout based on a plurality of properties represented in the circuit schematic.

* * * * *